United States Patent [19]
Castellani

[11] Patent Number: 5,910,365
[45] Date of Patent: Jun. 8, 1999

[54] SELF-EXTINGUISHING CABLE RELEASING LOW QUANTITIES OF TOXIC AND CORROSIVE SMOKES AND GASES

[75] Inventor: Luca Castellani, Corsico, Italy

[73] Assignee: Pirelli Cavi S.P.A., Milano, Italy

[21] Appl. No.: 08/899,793

[22] Filed: Jul. 24, 1997

[30] Foreign Application Priority Data

Jul. 30, 1996 [IT] Italy .................................. MI96A1625

[51] Int. Cl.⁶ ...................................................... B32B 15/00
[52] U.S. Cl. ........................... 428/379; 428/375; 428/383; 428/391; 385/102; 174/110 SR; 525/437
[58] Field of Search .................................... 385/102, 100, 385/101; 174/100 SR, 120 SR; 156/244.12; 427/118, 120; 428/383, 357, 364, 374, 375, 379, 391; 525/437, 444

[56] References Cited

U.S. PATENT DOCUMENTS

| | | | |
|---|---|---|---|
| 4,769,287 | 9/1988 | Zaopo et al. | 428/379 |
| 4,868,053 | 9/1989 | Ohm et al. | 428/379 |
| 5,644,105 | 7/1997 | Castellani | 174/110 SR |

FOREIGN PATENT DOCUMENTS

| | | |
|---|---|---|
| 0 380 244 | 8/1990 | European Pat. Off. . |
| 0 380 245 | 8/1990 | European Pat. Off. . |
| 0 526 126 | 2/1993 | European Pat. Off. . |
| 0 526 161 | 2/1993 | European Pat. Off. . |
| 0 544 343 | 6/1993 | European Pat. Off. . |
| 2 193 216 | 2/1988 | United Kingdom . |
| 94/27298 | 11/1994 | WIPO . |

*Primary Examiner*—Phan T. H. Palmer
*Attorney, Agent, or Firm*—Finnegan, Henderson, Farrabow, Garrett & Dunner, L.L.P.

[57] ABSTRACT

A self-extinguishing cable releasing low quantities of toxic and corrosive smokes and gases for optical or electrical applications, comprises a self-extinguishing coating (3), releasing low quantities of toxic and corrosive fumes and gases, comprising:

a) a polymer base including from 30 to 60 parts of a thermoplastic polyester and from 40 to 70 parts of a silicone-polyimide polymer;

b) at least 0.5 parts of an anti-hydrolysis agent of the thermoplastic polyester and at least 0.25 parts of a selected antioxidant agent per each 100 parts by weight of the polymer base.

Advantageously, the antioxidant agent is so selected that the coating (3) has a value of percent elongation at break not lower than 80% of the starting value and in any case not lower than 250%, after a 10-day aging at 175° C. in a hot air oven.

46 Claims, 1 Drawing Sheet

SELF-EXTINGUISHING CABLE RELEASING LOW QUANTITIES OF TOXIC AND CORROSIVE SMOKES AND GASES

DESCRIPTION

This invention relates to a cable, in particular to an electric cable of the so-called low-tension type or to an optical cable, self-extinguishing and releasing low quantities of toxic and corrosive smokes and gases.

The invention also relates to a coating for use in the manufacture of the aforementioned cables.

As it is known, for a number of different cable types and in particular for thin wall low-tension cables to be used in closed environments, in public installations and services, such as for example rolling stock for railways, subways, trolley-bus and the like, it is necessary, on the one hand, to impart to the cable a number of geometric and mechanical characteristics as well as a suitable resistance to external agents (heat, oils), which allow an easy installation and assure good performances and a long working life thereof, and on the other hand, to assure that the cable as a whole releases low quantities of smokes and does not releases toxic and corrosive gases should a fire take place.

The problem of simultaneously achieving all these characteristics, in itself difficult to be solved, becomes still more complicated in case of the so-called thin wall cables, i.e. cables in which the thickness of the insulating layer is smaller (generally from 23% to about 27% less) than that traditionally used in cables.

In order to satisfy these requirements, recourse has been had for a long time to plastic materials, capable of providing the cable with the desired geometric and mechanical characteristics, incorporating suitable flame retarding agents, generally based on halogenated compounds, so as to achieve an adequate resistance against flame propagation in case of fire.

However, the above-identified flame retarding agents, while causing the cable to be substantially self-extinguishing, release in case of fire toxic and corrosive gases, the presence of which in the smokes is no longer tolerated by the latest standards.

In order to overcome this drawback, it has been suggested to cover the wire with a polymeric mixture—not incorporating any halogenated flame retarding agent—including at least a thermoplastic polymer having suitable characteristics of resistance to flame propagation and able to impart at the same time to the cable the desired geometric and mechanical characteristics.

So, for example, in International patent application PCT no. WO 94/27298 a cable is described which includes a monolayer coating essentially constituted by a polymeric mixture including:

a non-halogenated polyester having per se a Limiting Oxygen Index (L.O.I.) not greater than 21%, such as, for instance, polybutylene terephthalate or copolymers thereof, and a quantity not greater than 40% by weight to the total weight of the polymer mixture of a silicone-polyimide polymer, such as for instance a silicone-polyetherimide, said components having the desired characteristics of resistance to flame propagation.

In order to impart to the cable suitable characteristics of low smoke emission, this application suggests to use magnesium hydroxide in a quantity of from 10 to 50% by weight.

Such polymer mixture further comprises an anti-hydrolysis agent of the thermoplastic polymer and possibly an antioxidant agent. However, the experiments carried out by the Applicant have shown that cables made according to the teachings of said application WO94/27298 are such as to show an inadequate aging resistance.

In other words, such cables have shown a decay of their own characteristics of elasticity (percent elongation at break), upon accelerated aging, which is not compatible with the standards presently in force for low voltage miniaturized cables for use in public installations and services.

The technical problem at the base of this invention is therefore that of providing a cable, in particular a cable of the so-called thin wall type, which possesses low emission characteristics of non toxic and corrosive smokes in case of fire, geometric and mechanical characteristics allowing an easy installation, and above all, a cable which possesses an adequate aging resistance.

According to a first aspect of the invention, this problem is solved by a cable of the type mentioned hereinabove, which is characterized in that the outer coating of the wire comprises a polymer mixture comprising:

a) a polymer base including from 30 to 60 parts of a thermoplastic polyester and from 40 to 70 parts of a silicone-polyimide polymer;

b) at least 0.5 parts of an anti-hydrolysis agent of the thermoplastic polyester and at least 0.25 parts of a selected antioxidant agent per each 100 parts by weight of said base; said antioxidant agent being such that the coating shows, after a 10-day aging at 175° C. in a hot air oven, a value of percent elongation at break not lower than 80% of the starting value.

According to a second aspect of the invention, the aforesaid problem is solved by a coating for cable, self-extinguishing, releasing low quantities of toxic and corrosive smokes and gases, which is characterized in that it comprises:

a) a polymer base including from 30 to 60 parts of a thermoplastic polyester and from 40 to 70 parts of a silicone-polyimide polymer;

b) at least 0.5 parts of an anti-hydrolysis agent of the thermoplastic polyester and at least 0.25 parts of a selected antioxidant agent per each 100 parts by weight of said base; said antioxidant agent being such that the coating shows, after a 10-day aging at 175° C. in a hot air oven, a value of percent elongation at break not lower than 80% of the starting value.

According to a third aspect of the invention, the aforesaid problem is solved by a polymeric mixture characterized in that it comprises:

a) a polymer base including from 30 to 60 parts of a thermoplastic polyester and from 40 to 70 parts of a silicone-polyimide polymer;

b) at least 0.5 parts of an anti-hydrolysis agent of the thermoplastic polyester and at least 0.25 parts of a selected antioxidant agent per each 100 parts by weight of said base; said antioxidant agent being such that a cable coating obtainable by applying said polymer mixture on a wire shows, after a 10-day aging at 175° C. in a hot air oven, a value of percent elongation at break not lower than 80% of the starting value.

In the following description and in the appended claims, the term: wire, is used to indicate an electric conductor, such as for instance a cord including a plurality of twisted wires, an optical conducting core, including one or more optical fibers housed within a supporting element, or any elongated element capable of transporting energy in electrical or optical form.

According to the invention it has been found, in fact, that when the wire coating comprises the aforesaid combination of ingredients, the resulting cable possesses the desired characteristics, geometric, mechanical and of low emission of non toxic and corrosive smokes, without showing the drawbacks linked to the low aging resistance of the aforementioned prior art coatings.

Tests carried out have shown that the said combination of ingredients is such as to maintain at more than good values the mechanical characteristics (elongation at break and tensile stress at break) of the coating even in the long run.

Preferably, the cable coating shows as such a tensile stress at break and an elongation at break not lower than 49 MPa and 315% respectively, as well as a tensile stress at break and an elongation at break after a 10-day oven aging at 175° C. not lower than 33 MPa and, respectively, 250%.

Preferably, the polymer base of the invention includes from 40 to 60 parts and, more preferably, from 40 to 50 parts of thermoplastic polyester per each 100 parts by weight of the same.

Preferably, furthermore, the thermoplastic polyester of the invention is selected from the group comprising: polyalkylene terephthalate, polyalkylene terephthalate-polycarbonate polymer blends, and mixtures thereof.

In the following description and in the appended claims, the term: polyalkylene terephthalate, is used to indicate polymers or copolymers including alkylene terephthalate groups having the following structural formula:

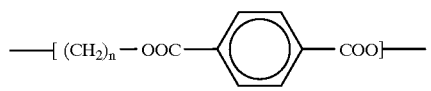
(I)

wherein n is a whole number of from 2 to 8.

The polyalkylene group —$(CH_2)_n$— is preferably an aliphatic or cycloaliphatic group, having either a linear or a branched structure.

Still more preferably, the polyalkylene group —$(CH_2)_n$— has a linear structure with n equal to four, so that polybutylene terephthalate is the polyalkylene terephthalate of most preferred use.

Within the framework of the present invention, the term: polybutylene terephthalate, is used to indicate either a butylene terephthalate homopolymer or a copolymer thereof with an aromatic, aliphatic or alicyclic dicarboxylic acid and/or a diol, or derivatives of said dicarboxylic acid or diol, such as for example isophthalic acid, 2,6-naphthalene dicarboxylic acid, 2,7-naphthalene dicarboxylic acid, diphenyl dicarboxylic acid, diphenyl sulfone dicarboxylic acid, diphenylether dicarboxylic acid, diphenoxyethane dicarboxylic acid, adipic acid, sebacic acid, decane dicarboxylic acid, p-hydroxy benzoic acid, o-carboxycaproic acid, hexamethylene glycol, decamethylene glycol, dodecamethylene glycol, bis(hydroxyethoxy-phenyl)sulfone, 2,2-bis(hydroxyethoxyphenyl)propane, diethylene glycol, cyclohexane dimethylol, cyclohexane dicarboxylic acid, etc.

A mixture of one or more of said dicarboxylic acids or diols may also be employed as needed.

Among the thermoplastic polyesters of the invention, particularly suitable are either polybutylene terephtalate having a melting point of from 220° C. to 230° C., or polybutylene terephthalate-polycarbonate mixtures or blends comprising up to 20% by weight of polycarbonate, wherein a partial transesterification has taken place between the two polymers.

For the purposes of the invention, examples of suitable polycarbonates include the polyesters of carbonic acid with aromatic diols, preferably dihydroxyphenylalkanes having the following structural formula:

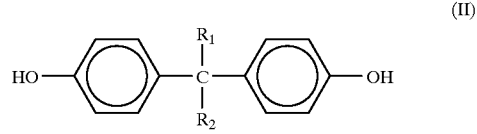
(II)

wherein $R_1$ and $R_2$ are independently an alkyl group comprising 1 to 4 carbon atoms.

Among them, the polyesters of carbonic acid with bisphenol A, wherein $R_1=R_2=CH_3$, are particularly preferred.

These polymer blends may be prepared starting from polybutylene terephthalate and polycarbonate available on the market, by mixing the two polymers in the molten state.

Polybutylene terephthalate and polybutylene terephthalate-polycarbonate blends of preferred use are those having a Melt Volume Index, measured at 250° C. with a weight of 2.16 kg according to ASTM standards D 1238, ranging between 7 and 10 $cm^3/10$ min, and still more preferably, equal to 8 or 9 $cm^3/10$ min, such as for instance the blends marketed respectively with the trade names VESTODUR® 3000 (Melt Volume Index=9 $cm^3/10$ min) and VESTODUR® X7190 (Melt Volume Index=8 $cm^3$ /10 min) (Hüls KG).

Preferably, the polymer base of the invention includes from 40 to 60 parts of a silicone-polyimide polymer per each 100 parts by weight of the same.

Preferably, the silicone-polyimide polymer is a silicone-etherimide copolymer, such as for instance the one described in International patent application PCT WO 87/00846, having the following structural formula:

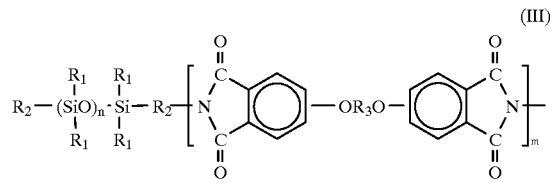
(III)

wherein:

$R_2$ is selected from alkyl groups having 1 to 14 carbon atoms and preferably is a propyl group; $R_1$ is selected from alkyl groups having 1 to 14 carbon atoms and preferably is a methyl group; $R_3$ is an aromatic bivalent group having 6 to 20 carbon atoms and preferably is a bisphenol A group; n and m are whole numbers selected in a range of from 4 to 10 and, respectively, of from 1 to 3.

A silicone-etherimide copolymer of preferred use in said polymeric mixture is in particular a block copolymer having a flexural modulus, measured at 250° C. according to ASTM standards D 790, ranging from 360 to 400 MPa, and still more preferably, of from 370 to 390 MPa, such as for example the block copolymer marketed with the trade name SILTEM® 1500 (General Electric Plastics).

According to a further embodiment and in order to further reduce the quantity of smokes produced in case of combustion, the silicone-etherimide copolymer may further comprise from 0.5 to 5% by weight of $ZnBO_4$ to total weight thereof.

A silicone-etherimide copolymer incorporating $ZnBO_4$ as an additive preferably used in said mixture is in particular a block copolymer having a flexural modulus, measured at 250° C. according to ASTM standards D 790, ranging from 360 to 400 MPa, and still more preferably from 370 to 390 MPa, such as for example the block copolymer marketed with the trade name SILTEM® 1550 (General Electric Plastics).

According to the invention, the mechanical characteristics of the cable coating may be effectively preserved in the long run by using at least 0.5 parts of a suitable anti-hydrolysis agent of the thermoplastic polyester and at least 0.25 parts of a suitable antioxidant agent.

Preferably, the coating of the invention includes from 0.5 to 2 and more preferably from 0.5 to 1 parts of said anti-hydrolysis agent per each 100 parts by weight of polymeric mixture.

Preferably, besides, the anti-hydrolysis agent is selected from the group comprising: polycarbodiimides, 2-oxazolines, and mixtures thereof.

A polycarbodiimide of preferred use is, in particular, the one marketed with the trade name STABAXOL®P (BAYER).

Oxazolines of preferred use are, instead, those described in "2-Oxazolines for the Reactive Extrusion", by P. Birnbrich et al., Kunststoffe German Plastics, 83, (1993), pp. 9 onward.

Preferably, the coating of the invention includes from 0.25 to 1 and more preferably from 0.25 to 0.5 parts of said antioxidant agent for every 100 parts by weight of the same, so as to keep an antioxidant/anti-hydrolysis weight ratio equal to 1:2.

According to the invention, suitable anti-hydrolysis agents are those that may keep the elongation at break and the tensile strength at break of the cable at values not lower than 80% of the starting value after a 10-day aging at 175° C.

For the purposes of the invention, it is intended that the above parameters of elongation at break and tensile strength at break have been assessed and must be assessed after the accelerated hot air oven aging method described hereinbelow.

Preferably, said antioxidant agent is selected from the group comprising phenolic antioxidants having the following structural formula:

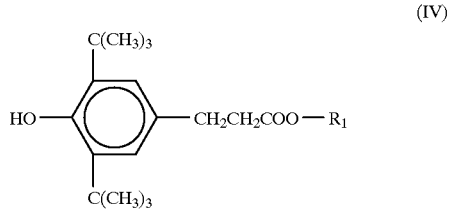

(IV)

wherein $R_1$ is an alkyl group comprising 1 to 10 carbon atoms.

Among them, octadecyl-3-(3,5-di-ter.butyl-4-hydroxyphenyl)propionate is a preferred antioxidant agent, such as for example the one marketed with the trade name IRGANOX 1076 (CIBA-GEIGY). The polymeric mixture of the invention may be produced by conventional mixing operations, for instance with a double-screw mixer/extruder, preferably keeping a temperature profile ranging from 200° to 240° C.

Preferably, furthermore, the polymers of the mixture are dried in a hot air oven at 110° C. for 16 hours before mixing.

In order to make easier the mixing operations of the ingredients, furthermore, it is advantageous and preferable to pre-disperse the anti-hydrolysis agent in the thermoplastic polyester and the antioxidant agent in the silicone-polyimide polymer.

Also in this case, the pre-dispersion operations may be carried out by a conventional double-screw mixer/extruder, keeping the temperature profiles mentioned hereinabove.

The cables of the invention may be produced by continuously forming a coating including the above described ingredients on an electrical or optical wire by means of conventional extrusion apparatuses, conventional per se and well known to those skilled in the art.

Preferably, the extrusion operations are carried out—after drying the polymer mixture in pellets, obtained from the mixing/pre-dispersion operations, in a hot air oven at 110° C. for 16 hours—keeping in the extruder a temperature profile preferably ranging between 230° and 295° C., according to the amount of silicone-polyimide copolymer used.

Further advantages and characteristics of the invention will be better apparent by the following description of some embodiments thereof, given by way of non limitative illustration with reference to the attached drawing figures, wherein.

Figure 1:
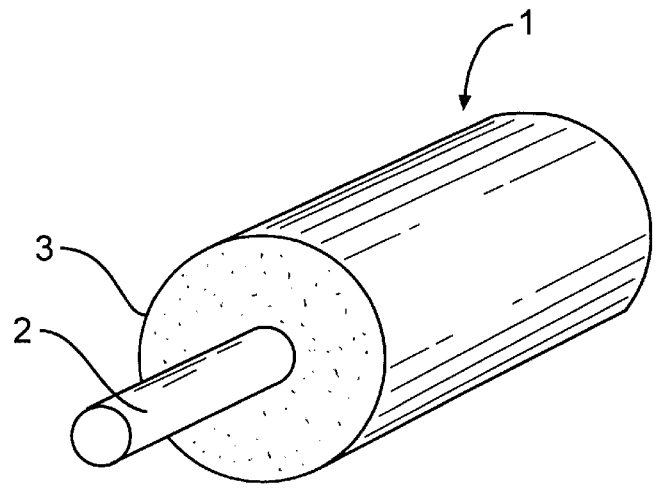
FIG. 1 shows, in perspective view and partial cross-section, a cable according to the present invention.

With reference to FIG. 1, 1 indicates a cable as a whole comprising a wire 2 surrounded by at least a coating layer 3 according to the present invention.

When cable 1 is an electrical cable, 2 is an electrical wire, for instance a cord comprising a plurality of wires of electrically conducting material, such as copper or aluminum, and 3 is the cable insulation.

Instead, when cable 1 is an optical cable, 2 is an optical wire comprising at least an optical fiber or any optical core wherein optical fibers are housed, and 3 is the cable sheath.

EXAMPLE 1

According to the invention, a cable 1, in particular a miniaturized electric cable with outer diameter equal to 1.70 mm, was produced by using as a wire 2 a 19×0.25 mm cord having a cross-section of 0.93 mm². A coating 3 having a thickness of 0.25 mm was then formed by extrusion on such wire, employing a polymeric mixture described later on.

A pre-dispersion of an anti-hydrolysis agent (polycarbodiimide STABAXOL® P, produced by BAYER) in polybutylene terephthalate having a Melt Volume Index of 9 cm³/10 min measured at 250° C. with a weight of 2.16 kg (VESTODUR® 3000 produced by Hüls) and a pre-dispersion of an antioxidant agent (IRGANOX® 1076 produced by Ciba-Geigy) in a silicone/polyetherimide copolymer having a flexural modulus, measured at 250° C. according to ASTM standards D 790, equal to about 386 MPa (SILTEM® 1500 produced by General Electric Plastics), were mixed in a Brabender double-screw mixer/extruder, keeping a temperature profile of from 200° to 240° C.

Before mixing, the polybutylene terephthalate and the silicone-polyetherimide copolymer were dried in a conventional hot air oven at 100° C. for 16 hours.

In this way, an additivated polymer mixture in pellets was obtained having the following composition in parts by weight per each 100 parts by weight of polymer base (phr):

| | |
|---|---|
| polybutylene terephthalate (VESTODUR ® 3000) | 60 |
| silicone-polyetherimide copolymer (SILTEM ® 1500) | 40 |
| anti-hydrolysis agent (STRABAXOL ® P) | 1 |
| antioxidant agent (IRGANOX ® 1076) | 0.5 |

The subsequent extrusion step was carried out in a conventional drawbench having an inner diameter of 45 mm, provided with a transfer thread screw, equipped with so-called "stretching" dies.

More particularly, the used drawbench was equipped with a mandrel with a diameter of 1.70/2.80 mm, and a die having a diameter of 3.60 mm.

The DDR stretching ratio during the extrusion operations was equal to about 11.

The temperature profile observed in the extruder from the feed zone to the head increased from about 230° C. to about 270° C., with a screw rotation speed of 2.1 rpm and a line speed of 9 m/min.

In this way, a cable 1 was obtained having an outer diameter of 1.70 mm, comprising a wire 2 having a diameter equal to 1.20 mm, coated with a coating 3, uniform and homogeneous, having a thickness of 0.25 mm.

EXAMPLES 2–4

Just in the same way as described in the preceding example 1, structurally identical cables 1 were prepared, using as many polymeric mixtures in pellets comprising the ingredients indicated in the following Table I.

In the table, all the compositions are expressed in parts by weight per each 100 parts by weight of polymer base (phr).

TABLE I

| Component | Ex. 2 | Ex. 3 | Ex. 4 |
|---|---|---|---|
| VESTODUR ® 3000 | 50 | 50 | 40 |
| SILTEM ® 1500 | 50 | — | 60 |
| SILTEM ® 1550 | — | 50 | — |
| STABAXOL ®P | 1 | 1 | 1 |
| IRGANOX ® 1076 | 0.5 | 0.5 | 0.5 |

The extrusion parameters, whenever different from those of Example 1, are shown in the following Table II.

TABLE II

| Example | T (° C.) | Screwturns* | Line speed** |
|---|---|---|---|
| 2 | 230–270 | 2.4 | 9 |
| 3 | 230–280 | 3.6 | 16 |
| 4 | 230–280 | 3.0 | 22 |

* = rpm
** = m/min

EXAMPLES 5–8

Comparison

According to the preparation method of the preceding Example 1, reference cables—structurally identical to those of the above examples—were produced using as many polymer mixtures in pellets having the composition shown in Table III.

In the table, all the compositions are expressed in parts by weight per each 100 parts by weight of polymer base (phr).

TABLE III

| Component | Ex. 5 | Ex. 6 | Ex. 7 | Ex. 8 |
|---|---|---|---|---|
| VESTODUR ® 3000 | 20 | 10 | 100 | — |
| SILTEM ® 1500 | 80 | 90 | — | 100 |
| STABAXOL ®P | 1 | 1 | 1 | 1 |
| IRGANOX ® 1076 | 0.5 | 0.5 | 0.5 | 0.5 |

The extrusion parameters, whenever different from those of Example 1, are shown in the following Table II.

TABLE IV

| Example | T (° C.) | Screwturns* | Line speed** |
|---|---|---|---|
| 5 | 240–290 | 3.0 | 12 |
| 6 | 250–295 | 3.2 | 12 |
| 7 | 235–270 | 4.6 | 10 |
| 8 | 250–280 | 3.3 | 12 |

* = rpm
** = m/min

EXAMPLES 9–10

Comparison

In the same way as the preceding example 1, reference cables were produced having an outer diameter equal to 1.25 mm, using as wire 2 a 7×0.25 mm cord having a cross-section of 0.35 mm². A coating 3 having a thickness of 0.25 mm was then formed by extrusion on such wire, using the polymeric mixtures described hereinbelow.

The extrusion step was carried out in a conventional drawbench having an inner diameter of 45 mm, provided with a transfer thread screw, equipped with so-called "stretching" dies.

More particularly, the used drawbench was equipped with a mandrel having a diameter of 1.00/1.70 mm and a die having a diameter of 3.00 mm.

The polymer mixtures employed, wherein magnesium hydroxide (KISUMA5A produced by KIOWA) was incorporated as agent capable of reducing the amount of smokes given off in case of combustion, have the composition shown in the following Table V.

In the table, all the compositions are expressed in parts by weight per each 100 parts by weight of polymer base (phr).

TABLE V

| Component | Ex. 8 | Ex. 9 |
|---|---|---|
| VESTODUR ® 3000 | 80 | 65.5 |
| SILTEM ® 1500 | 20 | 34.5 |
| KISUMA5A | 61.4 | 34.5 |
| STABAXOL ®P | 2.48 | 2.07 |
| IRGANOX ®1076 | 1.6 | 1.38 |

The extrusion parameters, whenever different from those of Example 1, are shown in the following Table VI.

TABLE VI

| Example | T (° C.) | Screwturns* | Line speed** |
|---|---|---|---|
| 8 | 215–250 | 1.5 | 15 |
| 9 | 230–260 | 1.5 | 12 |

\* = rpm
\*\* = m/min

In this way, cables 1 having an outer diameter of 1.25 mm were obtained, including a wire 2 having a diameter equal to 0.75 mm, coated with a coating 3, uniform and homogeneous, having a thickness of 0.25 mm.

EXAMPLE 11

Comparison

In the same way as the preceding Example 1, a further reference cable was obtained, having an outer diameter equal to 1.70 mm, using a wire 2 having a cross-section of 0.78 mm$^2$.

A coating 3 having a thickness of 0.35 mm was then formed by extrusion on said wire, employing the following polymeric mixture (parts by weight per each 100 parts by weight of polymer base):

| | |
|---|---|
| polybutylene terephthalate (VESTODUR ® 3000) | 70 |
| silicone-polyetherimide copolymer (SILTEM ® 1500) | 30 |
| anti-hydrolysis agent (STRAXOL ® P) | 1 |
| antioxidant agent (IRGANOX ® 1076) | 0.5 |

The extrusion step was carried out in a conventional drawbench having an inner diameter of 45 mm, provided with a transfer thread screw, equipped with so-called "stretching" dies.

More particularly, the used drawbench was equipped with a mandrel having a diameter of 1.20 mm, and a die having a diameter of 1.80 mm.

The temperature profile observed in the extruder from the feed zone to the head increased from about 258° C. to about 290° C., with a screw rotation speed of 9.7 rpm and a line speed of 45 m/min.

In this way, a cable 1 was obtained having an outer diameter of 1.70 mm, comprising a wire 2 having a diameter equal to 1 mm, coated with a coating 3, uniform and homogeneous, having a thickness of 0.35 mm.

In the following examples, the cables obtained according to the preceding Examples 1–11 have been submitted to several comparative tests having the purpose of evaluating the mechanical, fire resistance, smoke corrosivity and toxicity, and aging resistance characteristics of coating 3 of the wire 2.

EXAMPLE 12

Mechanical Characteristics

The tensile strength at break (CR) and percent elongation at break (AR) properties of the cables produced according to the preceding Examples 1–8 were evaluated according to French standards NF F 63-808, §5.2.E.4 and 11.2.3., using a traction speed of the samples equal to 100 mm/min instead of 50 mm/min.

Tests were carried out with a dynamometer INSTRON commonly available on the market.

Results are shown in the following Table VII (mean values of 5 measurements).

TABLE VII

| Example | CR (MPa) | AR (%) |
|---|---|---|
| 1 | 60.1 | 365 |
| 2 | 49.7 | 350 |
| 3 | 57.2 | 335 |
| 4 | 50.1 | 315 |
| 5 | 27.1 | 190 |
| 6 | 24.5 | 165 |
| 7 | 55.9 | 361 |
| 8 | 28.7 | 155 |

Figure 2:
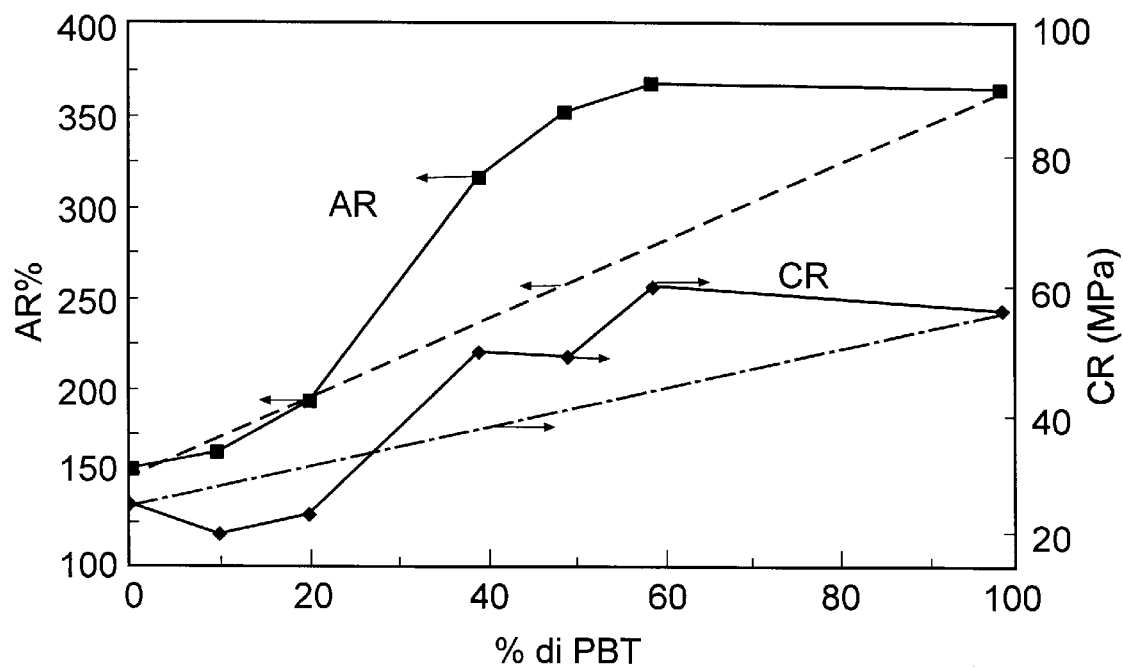
FIG. 2 shows a diagram of percent elongation at break and tensile strength at break of some preferred embodiments of wire coatings and/or cables according to the invention, as a function of the thermoplastic polyester content of the associated coatings.

The results of the tests carried out are also graphically illustrated in attached FIG. 2, which shows the elongation at break and tensile strength at break diagrams of the coatings of the considered cables, as a function of the thermoplastic polyester (polybutylene terephthalate) contents of the corresponding polymeric mixtures.

The data of Table VII and the diagrams of FIG. 2 show that, in the case of cables made according to this invention, the tensile strength at break values exceed by far the minimum requirements provided for by the above standards, while percent elongation at break values of the coatings as such are at least equal to 250%.

In addition, by considering the diagrams of FIG. 2, it is possible to notice that in case of cables manufactured according to the present invention, a quite surprising synergistic effect is observed, which leads to an unexpected improvement in both elongation at break and tensile strength at break of the cable coating.

Compared to the merely additive behavior that could be expected (represented by dotted lines in the figure), in fact, the combination of a thermoplastic polyester and a silicone-polyimide polymer surprisingly impart to the cable coated with the polymeric mixtures of the invention mechanical characteristics definitely greater than the sum of the effects imputable to the individual polymer components of the mixture.

In addition, by considering the diagrams of FIG. 2, it is possible to observe that such a synergistic effect reaches a peak when the thermoplastic polyester (polybutylene terephthalate) is included in the polymer base in a quantity of from 40 to 60 parts by weight.

Lastly, from the data of Table VII, it may be observed that both the cable of Example 5 and the cable of Example 6 do not provide adequate mechanical characteristics, as their tensile strength at break is lower than the minimum value of 30 MPa usually accepted for most applications.

EXAMPLE 13

Abrasion Resistance

Abrasion resistance properties of the cables produced according to the preceding Examples 1–6 and 8 were evaluated according to French standards NF F 63-808, §5.5.2.5. and 11.4.2.5., using a weight of 900 g at 55 cycles/min, with a blade having a diameter of 0.45 mm.

The results of the tests are shown in the following Table VIII.

TABLE VIII

| Example | No. of cycles | Mean |
| --- | --- | --- |
| 1 | 150,119,147,301,692, 793,670,497 | 421 |
| 2 | 300,257,31,247,361, 233,455,231 | 264 |
| 3 | 397,408,551,516 | 468 |
| 4 | 141,210,392,222,582, 714,170,440 | 358 |
| 5 | 180,30,79,324 | 153 |
| 6 | 81,90,130,152 | 113 |
| 8 | 62,61,78,20,186, 48,30,102 | 74 |

Since according to the aforesaid standards the admitted minimum number of cycles is equal to 100 and the admitted minimum mean value is equal to 150, the data of Table VIII show that all the cables of the invention pass the test, while the reference cables of Examples 5, 6 and 8 do not provide an adequate abrasion distance.

EXAMPLE 14

Flame Behavior

Flame resistance properties of the cables produced according to preceding Examples 1–4, 7 and 11 were evaluated according to the IEC standards 332-1.

The tests carried out have shown that while all the cables of the invention (Examples 1–4) pass the tests, the reference cables of the preceding Examples 7 and 11—wherein the silicone-polyetherimide polymer is absent (Example 11) or is present in a quantity of less than 40 parts by weight to the total weight of the polymer base (Example 11)—do not provide an adequate flame resistance (burning of all test samples).

Such results have been obtained in the absence of flame retardant additives such as, for instance, halogenated compounds.

EXAMPLE 14

Smoke Behavior

The evaluation of the physical and toxicity characteristics of the smokes developed by the cables was carried out, according to French standards NF F 63-808,—§5.5.4.7 and 11.4.4.9, on the cables of the preceding Examples 3, 4 and 7.

More particularly, said standards require that the so-called smoke index (I.F.)—as defined by the formula hereunder—be smaller than 5.

$$I.F.=D_m/100+VOF4/30+I.T.C._{cable}/2$$

wherein:

$D_m$=maximum optical smoke density;

VOF4=clouding after 4 minutes;

$I.T.C._{cable}$=conventional toxicity index of the cable.

The latter parameter is defined as follows:

$$I.T.C._{cable}=100\times[\Sigma t_i/CC_i]\times m_i/m_t$$

wherein:

$t_i$=concentration of the gases found in the smokes (mg/g of coating);

$CC_i$=critical concentrations of gases (mg/m$^3$);

$m_i$=linear mass of the cable coating (g/m);

$m_t$=linear mass of the cable (g/m).

The results of the tests carried out (mean of 3 tests) are shown in the following Table IX.

TABLE IX

| Example | $D_m$ | VOF4 | $I.T.C._{cable}$ | I.F. |
| --- | --- | --- | --- | --- |
| 3 | 79/110/118 | 57/35/38 | 1.38 | 3.15 |
| 4 | 82/120/111 | 36/54/42 | 1.53 | 3.28 |
| 7 | 85/102/82 | 201/189/182 | 0.67 | 7.58 |

The tests carried out have shown that the cables of the invention (Examples 3 and 4) pass the test.

EXAMPLE 15

Smoke Corrosivity

The evaluation of the corrosivity of smokes developed during combustion of the cable coatings of the preceding examples 1, 4 and 7, was carried out according to the international IEC standards 754-2, by burning test pieces at 935° C. and by measuring pH and conductivity of the scrubbing water of combustion smokes.

The pH value of distilled scrubbing water as such was equal to about 5.4, while the electric conductivity value was equal to 0.10 $\mu$S/mm.

More particularly, said standards provide for the mean pH value of smoke scrubbing water, referred to 1 liter, to be greater than 4.3 and for the mean conductivity value to be not greater than 10 $\mu$S/mm.

The results of the tests carried out (mean of 3 tests) are shown in the following Table X.

TABLE X

| Example | pH | Elec. conductivity ($\mu$S/mm) |
| --- | --- | --- |
| 1 | 5.4 | 2.53 |
| 4 | 5.6 | 3.04 |
| 7 | 4.8 | 0.49 |

The tests carried out have shown that all the cables examined pass the test.

EXAMPLE 16

Aging Resistance

The evaluation of the characteristics of aging resistance of the cables was carried out by submitting the corresponding coatings to a test of accelerated aging in a hot air oven according to the following method.

The tests were carried out on cable samples of the preceding Examples 1, 2, 3 and 4 (invention), as well as 9 and 10 (comparison).

5 test pieces having a length equal to 100 mm were obtained from each cable, which pieces were then submitted to aging at a temperature of 175±3° C. in a conventional natural hot air circulation oven kept at room pressure.

Test pieces were hung in the oven at a distance of at least 20 mm from one another and in such a way as not to take more than 0.5% of the inner volume of said oven.

At the end of the aging test, having a duration of at least 10 days, the samples were taken out of the oven and gradually cooled keeping them for at least 16 hours at a temperature of 23±5° C., avoiding exposure to direct sunlight.

As said above, for the purposes of this invention it is intended that the features of elongation at break and tensile strength at break after aging are evaluated and must be evaluated once the above described method has been carried out.

In particular, the mechanical characteristics of elongation at break and tensile strength at break of the sample coatings were measured according to French standards NF F 63-808, §5.2.E.4 and 11.2.3., employing a traction speed of the samples equal to 100 mm/min instead of 50 mm/min.

The results of the tests carried out are shown in the following Table XI, together with the data collected from test samples of non-aged cables (mean of 5 tests).

TABLE XI

| Example | CR (MPa) | | AR (%) | |
|---|---|---|---|---|
| | as such | after aging | as such | after aging |
| 1 | 60.0 | 42.8 | 365 | 365 |
| 2 | 49.4 | 34.2 | 350 | 350 |
| 3 | 57.2 | 41.7 | 335 | 325 |
| 4 | 50.6 | 46.5 | 315 | 275 |
| 9 | 34.9 | 49.6 | 15 | 15 |
| 10 | 32.8 | 44.3* | 355 | 11* |

The tests carried out have shown that while the cables of the invention (Examples 1–4) show a % elongation at break substantially identical to the starting one (Examples 1 and 2) or in any case not lower than 80% of the starting value (Examples 3 and 4), the reference cables incorporating magnesium hydroxide (Examples 9 and 10) show either a percent elongation at break quite unsatisfactory both before and after aging (Example 9), or an almost complete loss of elasticity characteristics after only 5 days of oven aging (Example 10).

Therefore, according to the present invention, it has been found that a cable coating which fully complies with the needs may be obtained by forming said coating as described above, provided that the ingredients employed are so selected as to ensure an adequate aging resistance.

From what has been described and illustrated above it is immediately evident that the cable of the invention has all those features that make it suitable for use in public installations and services, and In particular in railway rolling stock.

Thanks to the excellent aging resistance of its coating, the cable of the invention can keep its elasticity and flexibility characteristics over time, so that the formation in time of cracks and breaks in the coating is substantially avoided.

The achievement of these features is even more remarkable if one takes into account that—in a preferred embodiment—the cables of the invention are of the so-called miniaturized type, i.e. they have a coating of minimum thickness.

Clearly, a skilled man in the art may introduce changes and variants to the invention described hereinabove in order to satisfy specific and contingent application requirements, which changes and variants fall anyhow within the scope of protection as defined by the following claims.

I claim:

1. Cable comprising at least a conductor (2) and an outer coating (3), self-extinguishing, releasing low quantities of toxic and corrosive smokes and gases, characterized in that said outer coating (3) comprises:
   a) a polymer base including from 30 to 60 parts of a thermoplastic polyester and from 40 to 70 parts of a silicone-polyimide polymer;
   b) at least 0.5 parts of an anti-hydrolysis agent of the thermoplastic polyester and at least 0.25 parts of a selected antioxidant agent per each 100 parts by weight of said base;

said antioxidant agent being such that the coating (3) shows, after a 10-day aging at 175° C. in a hot air oven, a value of percent elongation at break not lower than 80% of the starting value.

2. A cable according to claim 1, characterized in that said thermoplastic polyester is selected from the group consisting of: polyalkylene terephthalate, polyalkylene terephthalate-polycarbonate polymer blends, and mixtures thereof.

3. A cable according to claim 2, characterized in that said polyalkylene terephthalate is a polymer or a copolymer comprising alkylene terephthalate groups wherein the polyalkylene group is an aliphatic or cycloaliphatic group, having linear or branched structure, comprising from 2 to 8 carbon atoms.

4. A cable according to claim 3, characterized in that said polyalkylene terephthalate has a melting temperature of from 220 to 230° C.

5. A cable according to claim 2, characterized in that said polyalkylene terephthalate-polycarbonate polymer blends comprise up to 20% by weight of polycarbonate.

6. A cable according to claim 2, characterized in that said polycarbonate is selected from the group consisting of polyesters of carbonic acid with aromatic diols having the following structural formula:

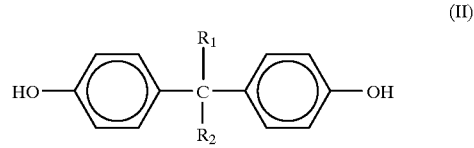

(II)

wherein $R_1$ and $R_2$ are independently an alkyl group comprising 1 to 4 carbon atoms.

7. A cable according to claim 1, characterized in that said silicone-polyimide polymer is a silicone-etherimide copolymer having the following structural formula:

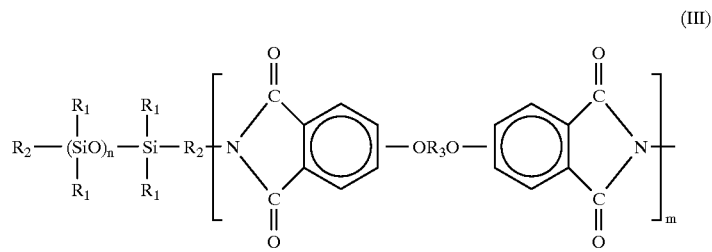

(III)

wherein:
R₂ is selected from alkyl groups having 1 to 14 carbon atoms; R₁ is selected from alkyl groups having 1 to 14 carbon atoms; R₃ is an aromatic bivalent group having 6 to 20 carbon atoms; n and m are whole numbers selected in a range of from 4 to 10 and, respectively, of from 1 to 3.

8. A cable according to claim 7, characterized in that the silicone-etherimide copolymer further comprises from 0.5 to 5% by weight of ZnBO₄ to the total weight thereof.

9. A cable according to claim 7, characterized in that said silicone-etherimide copolymer has a flexural modulus, measured at 250° C. according to ASTM standards D 790, of from 360 to 400 MPa.

10. A cable according to claim 7, wherein R₂ is a propyl group.

11. A cable according to claim 7, wherein R₁ is a methyl group.

12. A cable according to claim 7, wherein R₃ is a bisphenol A group.

13. A cable according to claim 1, characterized in that said coating (3) shows, after a 10-day aging at 175° C. in a hot air oven, a percent elongation at break not lower than 250%.

14. A cable according to claim 1, characterized in that said anti-hydrolysis agent is selected from the group consisting of: polycarbodiimides, 2-oxazolines, and mixtures thereof.

15. A cable according to claim 1, characterized in that said antioxidant agent is selected from the group consisting of phenolic antioxidants having the following structural formula:

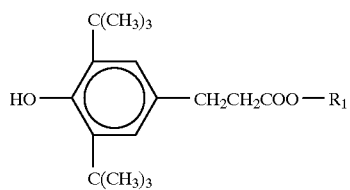

(IV)

wherein R₁ is an alkyl group comprising 1 to 10 carbon atoms.

16. A cable according to claim 15, characterized in that said antioxidant agent is octadecyl-3-(3,5-di-tert.butyl-4-hydroxyphenyl)-propionate.

17. A cable according to any one of the preceding claims, wherein said wire (2) is an electric wire.

18. A cable according to any one of claims 1–16, wherein said wire (2) is an optical wire and said coating (3) is the sheath of the cable.

19. A coating (3) for cables, self-extinguishing, releasing low quantities of toxic and corrosive smokes and gases, characterized in that it comprises:
a) a polymer base including from 30 to 60 parts of a thermoplastic polyester and from 40 to 70 parts of a silicone-polyimide polymer;
b) at least 0.5 parts of an anti-hydrolysis agent of the thermoplastic polyester and at least 0.25 parts of a selected antioxidant agent per each 100 parts by weight of said base;

said antioxidant agent being such that the coating (3) shows, after a 10-day aging at 175° C. in a hot air oven, a value of percent elongation at break not lower than 80% of the starting value.

20. A coating (3) according to claim 19, characterized in that said thermoplastic polyester is selected from the group consisting of: polyalkylene terephthalate, polyalkylene terephthalate-polycarbonate polymer blends, and mixtures thereof.

21. A coating (3) according to claim 20, characterized in that said polyalkylene terephthalate is a polymer or a copolymer comprising alkylene terephthalate groups wherein the polyalkylene group is an aliphatic or cycloaliphatic group, having linear or branched structure, comprising 2 to 8 carbon atoms.

22. A coating (3) according to claim 21, characterized in that said polyalkylene terephthalate has a melting temperature of from 220° to 230° C.

23. A coating (3) according to claim 20, characterized in that said polycarbonate is selected from the group consisting of polyesters of carbonic acid with aromatic diols having the following structural formula:

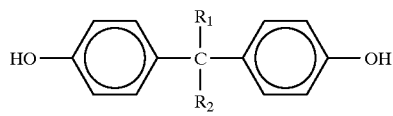

(II)

wherein R₁ and R₂ are independently an alkyl group comprising 1 to 4 carbon atoms.

24. A coating (3) according to claim 20, characterized in that said polyalkylene terephthalate-polycarbonate polymer blends comprise up to 20% by weight of polycarbonate.

25. A coating (3) according to claim 19, characterized in that said silicone-polyimide polymer is a silicone-etherimide copolymer having the following structural formula:

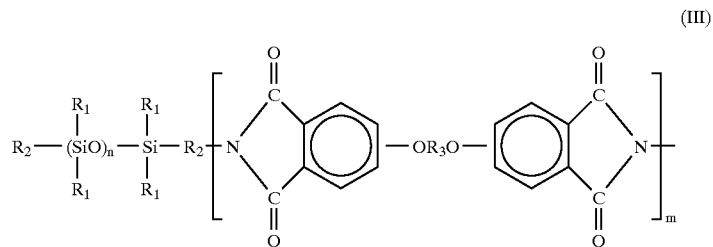

(III)

wherein:
R₂ is selected from alkyl groups having 1 to 14 carbon atoms; R₁ is selected from alkyl groups having 1 to 14 carbon atoms; R₃ is an aromatic bivalent group having 6 to 20 carbon atoms; n and m are whole numbers selected in a range of from 4 to 10 and, respectively, of from 1 to 3.

26. A coating (3) according to claim 25, characterized in that said silicone-etherimide copolymer has a flexural modulus, measured at 250° C. according to ASTM standards D 790, of from 360 to 400 MPa.

27. A coating (3) according to claim 25, characterized in that the silicone-etherimide copolymer further comprises from 0.5 to 5% by weight of ZnBO₄ to the total weight thereof.

28. A coating according to claim 25, wherein $R_2$ is a propyl group.

29. A coating according to claim 25, wherein $R_1$ is a methyl group.

30. A coating according to claim 25, wherein $R_3$ is a bisphenol A group.

31. A coating (3) according to claim 19, characterized in that said antioxidant agent is selected from the group consisting of phenolic antioxidants having the following structural formula:

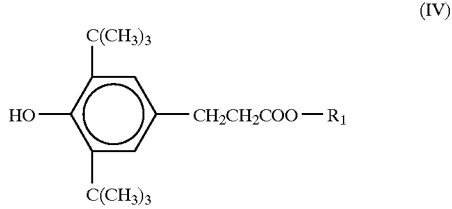

(IV)

wherein $R_1$ is an alkyl group comprising 1 to 10 carbon atoms.

32. A coating (3) according to claim 31, characterized in that said antioxidant agent is octadecyl-3-(3,5-di-ter.butyl-4-hydroxyphenyl)-propionate.

33. A coating (3) according to claim 19, characterized in that it shows, after a 10-day aging at 175° C. in a hot air oven, a percent elongation at break not lower than 250%.

34. A coating (3) according to claim 19, characterized in that said anti-hydrolysis agent is selected from the group consisting of: polycarbodiimides, 2-oxazolines, and mixtures thereof.

35. A polymeric mixture, characterized in that it comprises:

a) a polymer base including from 30 to 60 parts of a thermoplastic polyester and from 40 to 70 parts of a silicone-polyimide polymer;

b) at least 0.5 parts of an anti-hydrolysis agent of the thermoplastic polyester and at least 0.25 parts of a selected antioxidant agent per each 100 parts by weight of said base;

said antioxidant agent being such that a cable coating obtainable by applying said polymer mixture on a wire shows, after a 10-day aging at 175° C. in a hot air oven, a value of percent elongation at break not lower than 80% of the starting value.

36. A polymeric mixture according to claim 35, characterized in that said silicone-polyimide polymer is a silicone-etherimide copolymer having the following structural formula:

6 to 20 carbon atoms; n and m are whole numbers selected in a range of from 4 to 10 and, respectively, of from 1 to 3.

37. A polymeric mixture according to claim 36, characterized in that said silicone-polyimide polymer has a flexural modulus, measured at 250° C. according to ASTM standards D 790, of from 360 to 400 MPa.

38. A polymeric mixture according to claim 36, characterized in that said silicone-polyimide polymer further comprises from 0.5 to 5% by weight of $ZnBO_4$ to the total weights thereof.

39. A polymeric mixture according to claim 36, wherein $R_2$ is a propyl group.

40. A polymeric mixture according to claim 36, wherein $R_1$ is a methyl group.

41. A polymeric mixture according to claim 36, wherein $R_3$ is a bisphenol A group.

42. A polymeric mixture according to claim 35, characterized in that said antioxidant agent is selected from the group consisting of phenolic antioxidants having the following structural formula:

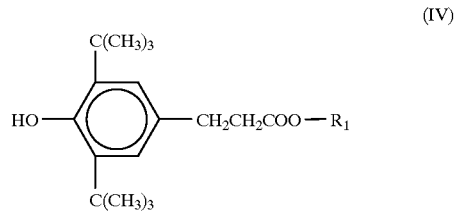

(IV)

wherein $R_1$ is an alkyl group comprising 1 to 10 carbon atoms.

43. A polymeric mixture according to claim 42, characterized in that said antioxidant agent is octadecyl-3-(-3,5-di-tert.butyl-4-hydroxyphenyl)-propionate.

44. A polymeric mixture according to claim 35, characterized in that said thermoplastic polyester is selected from the group consisting of: polyalkylene terephthalate, polyalkylene terephthalate-polycarbonate polymer blends, and mixtures thereof.

45. A polymeric mixture according to claim 44, characterized in that said polyalkylene terephthalate is a polymer or a copolymer comprising alkylene terephthalate groups wherein the polyalkylene group is an aliphatic or cycloaliphatic group, having linear or branched structure, comprising from 2 to 8 carbon atoms.

46. A polymeric mixture according to claim 35, characterized in that said anti-hydrolysis agent is selected from the

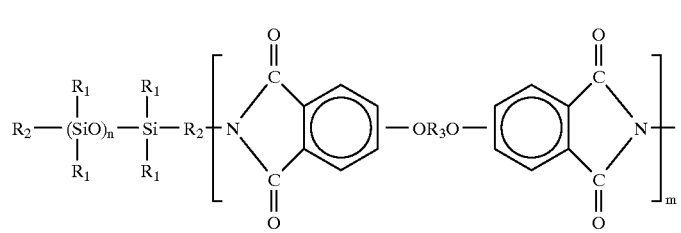

(III)

wherein:

$R_2$ is selected from alkyl groups having 1 to 14 carbon atoms; $R_1$ is selected from alkyl groups having 1 to 14 carbon atoms; $R_3$ is an aromatic bivalent group having group consisting of: polycarbodiimides, 2-oxazolines, and mixtures thereof.

* * * * *